United States Patent [19]
Lang et al.

[11] Patent Number: 4,944,680
[45] Date of Patent: Jul. 31, 1990

[54] ARTIFICIAL DENTURE-SKULL FOR DENTAL PURPOSES

[75] Inventors: Hans-Walter Lang, Leutkirch; Alfred Straka, Isny, both of Fed. Rep. of Germany

[73] Assignee: Kaltenbach & Voight GmbH & Co., Biberach an der Riss, Fed. Rep. of Germany

[21] Appl. No.: 337,397

[22] Filed: Apr. 13, 1989

[30] Foreign Application Priority Data

May 10, 1988 [DE] Fed. Rep. of Germany ....... 3816006

[51] Int. Cl.$^5$ .............................................. A61C 19/00
[52] U.S. Cl. .................................................... 434/264
[58] Field of Search .................. 434/263, 264; 433/54, 433/55, 56, 57, 58, 59

[56] References Cited

U.S. PATENT DOCUMENTS

| 2,670,538 | 3/1954 | Thompson | 433/58 X |
| 3,387,369 | 6/1968 | Swanson | 433/58 |
| 4,034,475 | 7/1977 | Lee | 433/57 X |
| 4,601,664 | 7/1986 | Bertino, III et al. | |

OTHER PUBLICATIONS

"Frasaco" of the Company Franz Sachs & Co. GmbH Kunststoffverarbeitung, pp. 17–19.

Primary Examiner—Richard J. Apley
Assistant Examiner—Rachel M. Healey
Attorney, Agent, or Firm—Scully, Scott, Murphy & Presser

[57] ABSTRACT

An artificial denture-skull for dental teaching and practice purposes, consisting of a model of an upper jaw or maxilla equipped with teeth and with a model of a lower jaw or mandible equipped with teeth, the last of which is pivotally connected with the upper jaw model through two jaw linkages which are arranged at both sides of the jaw models whereby for fixing the denture-skull in an open position, a downwardly extending latching device is provided on the upper jaw model and which able to be brought into engagement with the lower jaw model. For the most possibly complete simulation of the human head, the denture-skull is also connectable with a cranial cavity-forming skull portion, as well as with a pocket-shaped covering which possesses an oral aperture.

4 Claims, 2 Drawing Sheets

ARTIFICIAL DENTURE-SKULL FOR DENTAL PURPOSES

BACKGROUND OF THE INVENTION

1. Field of the Invention

The present invention relates to an artificial denture-skull for dental teaching and practice purposes, consisting of a model of an upper jaw or maxilla equipped with teeth and with a model of a lower jaw or mandible equipped with teeth, the last of which is pivotally connected with the upper jaw model through two jaw linkages which are arranged at both sides of the jaw models whereby for fixing the denture-skull in an open position, a downwardly extending latching device is provided on the upper jaw model and which is able to be brought into engagement with the lower jaw model For the most possibly complete simulation of the human head, the denture-skull is also connectable with a cranial cavity-forming skull portion, as well as with a pocket-shaped covering which possesses an oral aperture.

2. Discussion of the Prior Art

A denture skull of this type has become known from the brochure "Frasaco", issued by Franz Sachs & Co. GmbH Kunststoffverarbeitung, pages 17 through 19. In this known denture-skull, the latching device consists of a solid locking clamp, which possesses such a width that the rear opening of the denture-skull is blocked thereby. This has the consequence that any work which is carried out on the teeth by the practicing person cannot be observed from the back and commented upon by an expert.

SUMMARY OF THE INVENTION

The invention, as described in detail hereinbelow, has as an object the provision of an artificial denture-skull of the above-mentioned type, in which there is afforded an open, unobstructed view against the rear opening in the denture-skull.

The advantages which are achieved through the intermediary of the present invention can be essentially ascertained in that, through the construction of the latching device in the form of two latching struts, and due to the positioning of the latching struts adjacent to the articulating jaw linkages which are located at the sides, the denture opening is not covered by the latching device, such that the view from behind through the rear denture aperture towards the teeth of the jaw models remains open and unobstructed.

BRIEF DESCRIPTION OF THE DRAWINGS

Further advantageous modifications of the invention can now be readily ascertained from the following detailed description of exemplary embodiments thereof, taken in conjunction with the accompanying drawings; in which.

DETAILED DESCRIPTION

Figure 1:
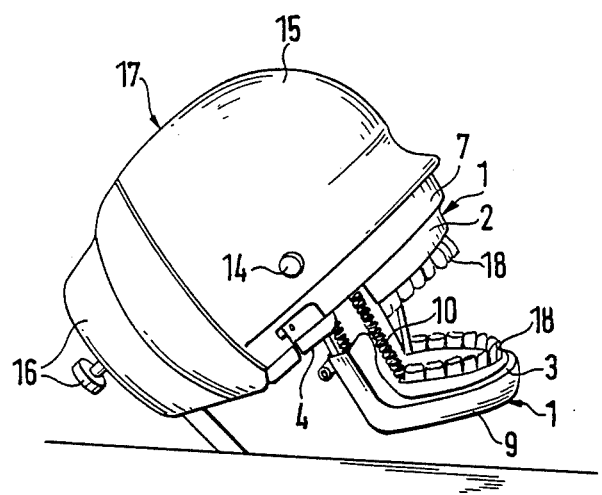
FIG. 1 illustrates a side view of the denture-skull in the open position with an attached skull portion defining the cerebral cavity.
Figure 2:
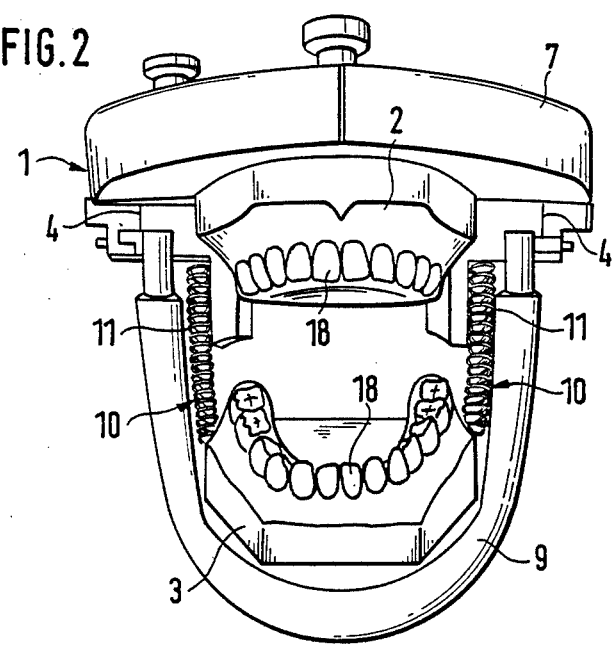
FIG. 2 illustrates a front view of the denture-skull in the open position thereof.

The artificial denture-skull 1 consists of the model of an upper jaw 2 and the model of a lower jaw 3, in which the lower jaw model 3 is connected for pivotal movement with the upper jaw model 2 through two articulating jaw linkages 4 which are arranged at the sides of the jaw models 2, 3; and for fixing the denture-skull 2 in an open position, on the upper jaw model 2 there is provided a downwardly extending latching device 5 which is able to be brought into engagement with the lower jaw model 3.

The teeth of the jaw models 2, 3 are identified by the reference numerals 18. Through the employment of a releasable latching device 14, the denture-skull 1 is equipped with a skull portion 15 defining a cranial cavity. Reference numeral 16 identifies a retainer and adjusting means for the phantom head 17 which is formed by the denture-skull 1 and the cerebral or cranial-cavity skull portion 15.

The latching device 5 is constituted from two latching struts 6 each of which extends from mounting block 12 which is adjacent a respective jaw linkage 4. As can be ascertained from FIG. 3, as a result there is facilitated an open view against the rear opening 13 in the denture-skull 1, so that there is afforded an unobstructed inspection of the occlusion.

Figure 3:
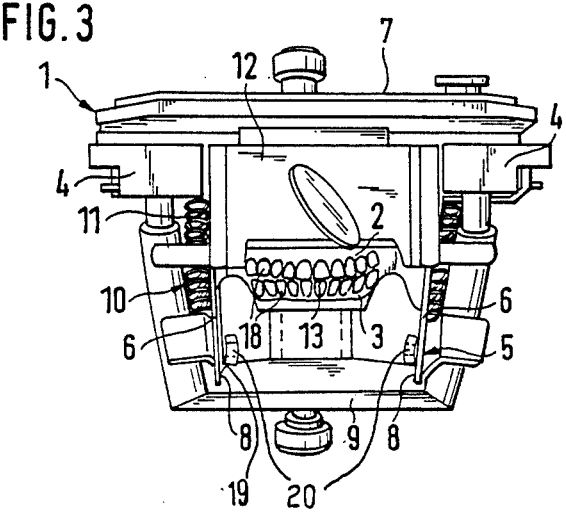
FIG. 3 illustrates a rear view of the denture-skull in its closed position.

The advantage of the open view towards the mentioned rear opening 13 is still further enhanced when as can be ascertained from FIG. 3, the latching struts 6 are constructed as flat rods which are presently arranged in a plane which extends in parallel with the pivoting plane for the lower jaw model 3. The latching struts 6 can be resiliently yieldable transversely relative to the last-mentioned plane.

It is expedient, as illustrated, when the latching struts 6 are supported on an upper supporting plate 7 which carries the upper jaw model 2, and at their lower ends 8 are adapted to be brought into latching engagement with a lower supporting plate 9 which carries the lower jaw model 3. Hereby, the latching struts 6 are supported against a mounting block 12 which is arranged on the upper retainer plate 7 where the mounting block 12 is positioned adjacent to the jaw linkages 4. To facilitate the closing of the jaw models 2 and 3, latching struts 6 are provided at their lower ends 8 with a hook means 19 which engages a boss member 20 mounted on lower supporting plate 9.

In order that the open view towards the rear denture opening 13 will not be adversely influenced by the position of a locking spring arrangement 10 which is fastened to both jaw models 3, 2 for effectuating the movement of the lower jaw model 3 towards the upper jaw model, the locking spring arrangement 10 is constituted of two closure springs 11 which are closely adjacent to the respective jaw linkages 4. The locking springs 11 are formed by spiral tension springs.

What is claimed is:

1. Artificial denture-skull for dental teaching and practice, including an upper jaw model and a lower jaw model; jaw linkage means connecting said lower jaw model for pivotal movement with said upper jaw model, said jaw linkages being arranged at both sides of the jaw models; and latching means for fixing the denture-skull in an open position being arranged on said upper jaw model, said latching means extending downwardly and being engageable with said lower jaw model, said latching means including a mounting block fixed on said upper jaw model and latching struts each extending from said mounting blocks, said mounting block positioned adjacent said jaw linkage means; wherein said mounting block is positioned on said upper jaw model within the plane of said upper jaw model, and said latching struts extend from said mounting block in a plane parallel to and adjacent to the plane of said jaw linkages so as to maintain an unobstructed rear view of said upper and lower jaw models.

2. Denture-skull as claimed in claim 1, wherein said latching struts each comprise a flat rod, said rods being each arranged in a plane extending in parallel with a pivoting plane for said lower jaw model.

3. Denture-skull as claimed in claim 1, said latching struts mounting block are supported against an upper support plate carrying the upper jaw model and the lower ends of which are positionable into latching engagement with a lower support plate carrying said lower jaw model.

4. Denture-skull as claimed in claim 1, comprising locking spring means for effectuating the movement of said lower jaw model towards said upper jaw model, said spring means being fastened to both upper and lower jaw models and being constituted from two locking springs which are positioned adjacent to each respective jaw linkage means.

* * * * *